(No Model.)
E. C. JONES, Jr.
DRINKING GOBLET, &c.
No. 600,427.    Patented Mar. 8, 1898.
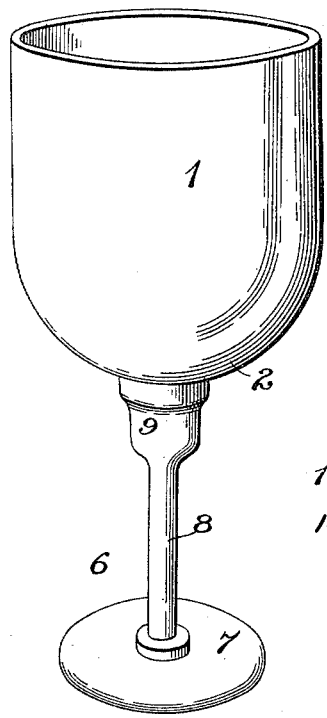
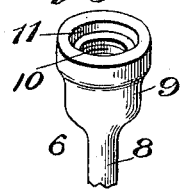
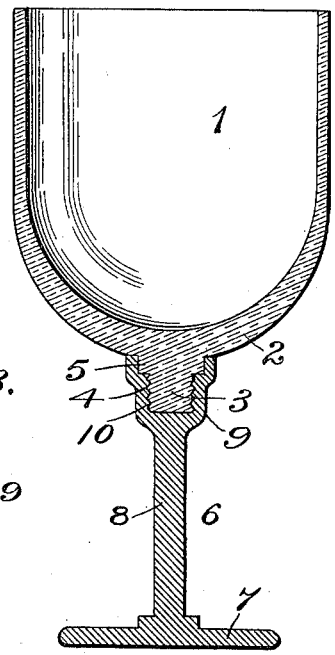
Witnesses
Edwin G. McKee
J. D. Caplinger
Inventor
Edward C. Jones Jr.
By his Attorneys,
C. A. Snow & Co.
THE NORRIS PETERS CO., PHOTO-LITHO., WASHINGTON, D. C.

UNITED STATES PATENT OFFICE.

EDWARD CULLIETT JONES, JR., OF SAN ANTONIO, TEXAS.

DRINKING-GOBLET, &c.

SPECIFICATION forming part of Letters Patent No. 600,427, dated March 8, 1898.

Application filed April 22, 1897. Serial No. 633,250. (No model.)

*To all whom it may concern:*

Be it known that I, EDWARD CULLIETT JONES, Jr., a citizen of the United States, residing at San Antonio, in the county of Bexar and State of Texas, have invented a new and useful Improvement in Drinking-Goblets and the Like, of which the following is a specification.

This invention relates to certain improvements in goblets and other similar glassware such as is employed for table use, and has for its object to provide a goblet or the like having a bowl of glass and a metal stem or base separably connected with the bowl, the parts being so constructed that should the bowl be broken the stem may be detached therefrom and the broken bowl replaced.

The invention consists in certain novel features of the construction, combination, and arrangement of the various parts of the improved device whereby certain important advantages are attained and the device is made simpler, cheaper, and otherwise better adapted and more convenient for use, all as will be hereinafter fully set forth.

The novel features of the invention will be carefully defined in the claim.

In order that my improvements may be the better understood, I have shown in the accompanying drawings a drinking-goblet made in accordance with my invention, in which drawings—

Figure 1 is a perspective view of the goblet. Fig. 2 is an axial section taken through the same. Fig. 3 is a fragmentary perspective view showing the upper end of the stem of the goblet and illustrating the recess and screw-threads for engaging the shoulder and threaded stem on the bowl.

In the drawings, 1 indicates the bowl of the improved goblet, usually made of glass and having a bell form, the sides of said bowl being by preference made thinner than the bottom portion 2, which, as shown in Fig. 2, is considerably thickened and provided at the central part of its under side with an integral depending stud 3, having its exterior surface screw-threaded, as shown at 4 in Fig. 2. On the under side of the thickened bottom 2 of the bowl is formed an annular projecting shoulder 5, surrounding the screw-threaded stud 3 and concentric with the same, being of cylindrical form and having a flattened under surface.

6 indicates as a whole the base of the improved drinking-goblet, said base being formed with a flattened circular foot 7 to rest upon the table or other supporting-surface and a stem 8, projecting up from the center of said foot 7 and serving as a handle for the goblet. The stem 8 is enlarged at its upper end, as shown at 9, and in said enlarged portion 9 is formed a socket 10, provided with interior screw-threads to receive the screw-threaded stud 3 of the bowl, which screws into the same, as shown in Fig. 2.

The socket 10 in the enlarged portion 9 of the stem 8 of the goblet is formed with an enlarged mouth portion 11, forming an annular seat or recess surrounding the threaded part of the socket, wherein is adapted to fit the annular projecting shoulder 5, which is formed on the under side of the bottom of the goblet-bowl surrounding said screw-threaded stud 3. The said seat or recess 11 is provided with a smooth bottom surface to fit tightly against the flat under surface of said annular shoulder 5, and said shoulder and seat are made of the same diameter, so as to fit snugly one in the other.

The base of the improved drinking-goblet is constructed of aluminium or any other suitable metal, and the bowl thereof will be made of glass, and it will be seen that should the bowl be broken the fragments may be unscrewed from the base, which will remain intact, after which a perfect bowl may be connected with the base.

By providing the base of the goblet and the upper extremity of the enlarged portion of the stem with reciprocal engaging devices outside of and surrounding the screw-threaded stem and socket by means of which they are held together it will be seen that an even and firm support is formed on the base surrounding the screw-threaded stud and that said stud is not so likely to be cracked off by blows upon the bowl or base as it would otherwise be. Moreover, the arrangement of the threaded stud on the bowl and the threaded socket in the stem of the base, which is formed of opaque metal, completely conceals the means for joining the two parts together. Were the positions of the stud and the socket reversed, it is evident the stud would be visible through the glass bowl, making an unsightly article.

I do not wish to confine my invention in its application to drinking-goblets, since it is obvious the improvements may be applied to stem glassware of various kinds—as, for example, cake and fruit stands and the like.

I am aware that it is not new to construct a goblet in two parts, a base and a bowl, the base screwing into a socket formed in an integral part of or in a cap cemented to the bowl, so as to enable the parts to be readily detached, and such a construction I do not claim as my invention; but What I do claim, and desire to secure by Letters Patent, is—

A sectional goblet comprising the frangible bowl formed with the integral, central stud having the vertical annular shoulder 5 adjacent to the lower face of said bowl and the threaded tenon 4 of less diameter than the shoulder and forming therewith an annular horizontal ledge, and a metallic stand 6 having the upper part of the stem thereof provided with an interiorly-threaded socket 9 which is cylindrically enlarged and smooth at its upper open end, said enlarged smooth end of the socket being shouldered internally to have tight frictional contact with the horizontal ledge and the annular shoulder of the bowl-stud and the upper edge of said socketed stem abutting directly against the bowl, whereby the socketed metallic stand engages by interlocking threads and frictional contact with the bowl and the joint between said bowl and stand is reinforced and protected, substantially as described.

In testimony that I claim the foregoing as my own I have hereto affixed my signature in the presence of two witnesses.

EDWARD CULLIETT JONES, JR.

Witnesses:
   V. M. VILLEMAIN,
   F. B. CONRAD.